United States Patent
Michaux et al.

(10) Patent No.: US 9,644,133 B2
(45) Date of Patent: May 9, 2017

(54) COMPOSITIONS AND METHODS FOR WELL COMPLETIONS

(75) Inventors: Michel Michaux, Verrieres-le-Buisson (FR); Laurent Gabilly, Malakoff (FR)

(73) Assignee: SCHLUMBERGER TECHNOLOGY CORPORATION, Sugar Land ( * ) Notice: Subject to any disclaimer, the term of this patent is extended or adjusted under 35 U.S.C. 154(b) by 0 days.

(21) Appl. No.: 13/989,809

(22) PCT Filed: Dec. 7, 2011

(86) PCT No.: PCT/EP2011/006364
§ 371 (c)(1),
(2), (4) Date: Jun. 12, 2013

(87) PCT Pub. No.: WO2012/079767
PCT Pub. Date: Jun. 21, 2012

(65) Prior Publication Data
US 2013/0255948 A1    Oct. 3, 2013

(30) Foreign Application Priority Data
Dec. 18, 2010    (EP) .................................... 10195830

(51) Int. Cl.
*E21B 33/13* (2006.01)
*C09K 8/48* (2006.01)
*C04B 28/04* (2006.01)

(52) U.S. Cl.
CPC ............... *C09K 8/48* (2013.01); *C04B 28/04* (2013.01); *E21B 33/13* (2013.01)

(58) Field of Classification Search
CPC .. E21B 33/13; E21B 33/14; C04B 2111/0031; Y10S 507/906
See application file for complete search history.

(56) References Cited

U.S. PATENT DOCUMENTS

| | | |
|---|---|---|
| 2,805,719 A | 9/1957 | Anderson |
| 3,501,323 A | 3/1970 | Moorehead |
| 3,558,335 A | 1/1971 | Messenger |
| 4,011,909 A | 3/1977 | Adams et al. |

(Continued)

FOREIGN PATENT DOCUMENTS

EP    0621247 A2    10/1994

OTHER PUBLICATIONS

DeBruijn et al., "High-Pressure, High-Temperature Technologies," Schlumberger Oilfield Review, Autumn 2008, pp. 46-60.*
(Continued)

*Primary Examiner* — Angela M DiTrani
*Assistant Examiner* — Andrew H Sue-Ako
(74) *Attorney, Agent, or Firm* — Andrea E. Tran

(57) ABSTRACT

Well-cementing compositions for use in high-pressure, high-temperature (HPHT) wells are often densified, and contain weighting agents such as hematite, ilmenite, barite and hausmannite. The weighting agents are usually finely divided to help keep them suspended in the cement slurry. At high temperatures, finely divided weighting agents based on metal oxides react with the calcium-silicate-hydrate binder in set Portland cement, leading to cement deterioration. Finely divided weighting agents based on metal sulfates are inert with respect to calcium silicate hydrate; consequently, set-cement stability is preserved.

11 Claims, 4 Drawing Sheets

(56) References Cited

U.S. PATENT DOCUMENTS

| | | | |
|---|---|---|---|
| 4,149,900 A | | 4/1979 | Childs et al. |
| 4,935,060 A | * | 6/1990 | Dingsoyr .................. 106/719 |
| 5,016,711 A | | 5/1991 | Cowan |
| 5,158,613 A | * | 10/1992 | Sargeant et al. ............ 106/737 |
| 5,379,843 A | | 1/1995 | Unger et al. |
| 6,565,647 B1 | | 5/2003 | Day et al. |
| 6,892,814 B2 | | 5/2005 | Heathman et al. |
| 7,449,061 B2 | * | 11/2008 | Barlet-Gouedard .... C04B 7/345 106/713 |
| 7,494,711 B2 | * | 2/2009 | Kaufman et al. ............ 428/403 |
| 7,618,927 B2 | * | 11/2009 | Massam et al. ............. 507/269 |
| 2003/0203822 A1 | | 10/2003 | Bradbury et al. |
| 2004/0118561 A1 | | 6/2004 | Heathman et al. |
| 2005/0098316 A1 | | 5/2005 | Heathman et al. |
| 2005/0277553 A1 | * | 12/2005 | Massam et al. ............. 507/103 |
| 2006/0108150 A1 | | 5/2006 | Luke et al. |
| 2007/0029088 A1 | | 2/2007 | Di Lullo Arias et al. |
| 2007/0125271 A1 | * | 6/2007 | Barlet-Gouedard .... C04B 7/345 106/638 |
| 2008/0041589 A1 | | 2/2008 | Oakley et al. |
| 2009/0038800 A1 | | 2/2009 | Ravi et al. |
| 2009/0038801 A1 | | 2/2009 | Ravi et al. |
| 2009/0044942 A1 | * | 2/2009 | Gupta ....................... 166/280.2 |
| 2010/0009874 A1 | | 1/2010 | Ballard et al. |
| 2010/0095871 A1 | | 4/2010 | Patil et al. |

OTHER PUBLICATIONS

Nelson EB, Michaux M and Drochon B: "Cement Additives and Mechanisms of Action," in Nelson EB and Guillot D. (eds.): Well Cementing (2nd Edition), Schlumberger, Houston (2006) 49-91.

"Petroleum and Natural Gas Industries—Cements and Materials for Well Cementing—Part 2: Testing of Well Cements," International Organization for Standards Publication No. 10426-2.

Office action for the equivalent Columbian patent application No. 13149894 issued on Jul. 29, 2014.

E.B. Nelson, V. Barlet-Gouedard, "Thermal Cements," in Nelson EB and Guillot D (eds.): Well Cementing—2nd Edition, Schlumberger, Houston 2006, pp. 319-341.

Office action for the equivalent Colombian patent application No. 13149894 issued on Jan. 15, 2015.

Patchen, "Reactions and Properties of Silica-Portland Cement Mixtures Cured at Elevated Temperatures", 1992, SPE Reprint Series No. 34: Cementing, Texas: Society of Petroleum Engineers Richardson, 11 pages.

Nelson, et al, "Well Cementing", 2006, Schlumberger, Second Edition, pp. 251-256.

Moore, "Drilling Practices Manual", 1974, Tulsa: The Petroleum Publishing Co., 19 pages.

Communication of a Notice of Opposition issued in related EP application 10195830.4 on May 11, 2016, 8 pages.

Office Action No. 25051 issued in related MX application MX/a/2013/006793 on Apr. 6, 2016, 6 pages.

Examination Report issued in related GCC application GC2011-20051 on Apr. 11, 2016, 5 pages.

Examination Report issued in the Related AU Application 2011344712, dated Mar. 6, 2014 (3 pages).

Examination Report issued in the related CA application 2820417, dated Nov. 7, 2014 ( 3 pages).

Examination Report issued in the related CA application 2820417, dated Jul. 6, 2016 ( 3 pages).

Office action issued in the related CN Application 201180060957.X, dated Nov. 14, 2014 (2 pages).

Office action issued in the related CN Application 201180060957.X, dated Aug. 10, 2015 (2 pages).

Office action issued in the related EA application 201390905, dated Dec. 4, 2014 (4 pages).

Office action issued in the related EG application 973/2013, dated Jan. 12, 2015 (2 pages).

Office action issued in the related EG application 973/2013, dated Sep. 10, 2015 (2 pages).

Extended Search report issued in the related EP Application 10195830.4, dated May 16, 2011 (7 pages).

Communication pursuant to article 94(3) issued in the related EP Application 10195830,4, dated Sep. 15, 2014 (6 pages).

Communication pursuant to article 94(3) issued in the related EP Application 10195830.4, dated Aug. 8, 2013 (3 pages).

Communication pursuant to article 94(3) issued in the related EP Application 10195830.4, dated Dec. 2, 2014 (5 pages).

Office action issued in the related ID application 2014/01288, dated Mar. 3, 2016 (1 page).

Nelson, et al, Special Cement systems—"Well Cementing", 2006, Schlumberger, Second Edition, pp. 233-268.

International Search Report and Written Opinion issued in the related PCT application PCT/EP2011/006364, dated Feb. 16, 2012 (11 pages).

International Preliminary Report on Patentability issued in the related PCT application PCT/EP2011/006364, dated Jun. 18, 2013 (7 pages).

* cited by examiner

COMPOSITIONS AND METHODS FOR WELL COMPLETIONS

This application is the PCT national phase application of PCT/EP11/006364, filed on Dec. 7, 2011, which claims the benefit of the disclosure of European Patent Application N° EP10195830.4 filed on Dec. 18, 2010, both applications being incorporated herein by reference in their entireties.

BACKGROUND

The statements in this section merely provide background information related to the present disclosure and may not constitute prior art.

This disclosure relates to compositions and methods for treating subterranean formations, in particular, compositions and methods for cementing subterranean wells.

During the construction of subterranean wells, it is common, during and after drilling, to place a tubular body in the wellbore. The tubular body may comprise drillpipe, casing, liner, coiled tubing or combinations thereof. The purpose of the tubular body is to act as a conduit through which desirable fluids from the well may travel and be collected. The tubular body is normally secured in the well by a cement sheath. The cement sheath provides mechanical support and hydraulic isolation between the zones or layers that the well penetrates. The latter function is important because it prevents hydraulic communication between zones that may result in contamination. For example, the cement sheath blocks fluids from oil or gas zones from entering the water table and polluting drinking water. In addition, to optimize a well's production efficiency, it may be desirable to isolate, for example, a gas-producing zone from an oil-producing zone. The cement sheath achieves hydraulic isolation because of its low permeability. In addition, intimate bonding between the cement sheath and both the tubular body and borehole is necessary to prevent leaks.

Portland cement is employed to cement the vast majority of subterranean wells. Achieving optimal cement-slurry placement and set-cement properties usually requires the incorporation of one or more additives that modify the chemical and/or physical behavior of the slurry. A plethora of additives exist that fall into several categories including (but not limited to) accelerators, retarders, dispersants, fluid-loss additives, extenders, pozzolans, weighting agents, swellable materials, gas-generating materials, and antifoam agents. An extensive discussion concerning additives for well cements may be found in the following publication—Nelson E B, Michaux M and Drochon B: "Cement Additives and Mechanisms of Action," in Nelson E B and Guillot D. (eds.): *Well Cementing* ($2^{nd}$ Edition), Schlumberger, Houston (2006) 49-91.

Designing cement slurries for high-pressure, high-temperature (HPHT) wells is particularly challenging. Generally speaking, HPHT wells begin when the bottomhole temperature exceeds about 150° C. (300° F.) and the bottomhole pressure exceeds about 69 MPa (10,000 psi). A complex array of additives—including retarders, dispersants, fluid-loss additives and silica stabilizers—is usually required to obtain a slurry that operators can successfully place in the well, and a set-cement that will provide casing support and zonal isolation throughout the life of the well.

Weighing agents are also frequently employed in cement slurries for HPHT wells. High-density slurries are required to exert sufficient hydrostatic pressure in the wellbore to maintain well control. One method for increasing the cement-slurry density is to reduce the amount of mix water. To maintain pumpability, the addition of a dispersant is required. The principal disadvantage of such reduced-water slurries is the difficulty of simultaneously achieving adequate fluid-loss control, acceptable rheological properties and slurry stability (i.e., no solids settling). Generally, the maximum slurry density attainable by reducing the mix-water concentration is about 2160 kg/m³ (18.0 lbm/gal).

Many HPHT wells require higher slurry densities. Under these circumstances, materials with a high specific gravity (known as weighting agents) are added. Such materials must meet several criteria to be acceptable as weighting agents. The particle-size distribution of the material must be compatible with the cement. Large particles tend to settle out of the slurry, while small particles tend to increase slurry viscosity. The mix-water requirement must be low (i.e., very little water should be necessary to wet the weighting-agent particles). The material must be inert with respect to the cement, and must be compatible with other additives in the cement slurry.

The most common weighting agents for Portland-cement slurries are hematite ($Fe_2O_3$), ilmenite ($FeTiO_3$), hausmannite ($Mn_3O_4$) and barite ($BaSO_4$). Their physical properties are given in Table 1. The specific gravities may vary from batch to batch owing to impurities that may be present.

TABLE 1

Physical Properties of Weighting Agents for Cement Slurries.

| Weighting Agent | Specific Gravity | Absolute Volume (L/kg) | Color | Additional Water Requirement (L/kg) |
|---|---|---|---|---|
| Hematite | 4.45 | 0.201 | Black | 0.019 |
| Ilmenite | 4.95 | 0.225 | Red | 0.000 |
| Hausmannite | 4.84 | 0.209 | Reddish brown | 0.009 |
| Barite | 4.33 | 0.234 | White | 0.201 |

Large particles with a high specific gravity have a strong tendency to settle. As shown by Stoke's law (Eq. 1), the settling velocity of a particle is more dependent on its size than on its specific gravity.

$$v = \frac{g \times (\rho - \rho_L) \times d^2}{18\mu_L} \quad \text{(Eq. 1)}$$

where:
v=settling velocity
g=acceleration of gravity
ρ=particle specific gravity
$\rho_L$=liquid specific gravity
d=particle diameter
$\mu_L$=liquid-medium viscosity.

For example, the specific gravities of hematite and silica sand are 4.95 and 2.65, respectively. According to Stoke's law, for a given particle size, the hematite particle would settle about twice as fast as the silica particle. However, for a given particle density, if the particle size is increased to 500 μm from 1 μM, the settling rate increases by a factor of 250,000.

Stoke's law clearly shows that the size of the solid materials added to a cement slurry should preferably be low in order to minimize settling problems. Thus, the use of weighting agents with very fine particle-size distributions would generally enhance the stability of cement slurries.

Barite is commercially available in several particle-size distributions, but it is not considered to be an efficient weighting agent compared to hematite, ilmenite or manganese tetraoxide. It has a lower specific gravity, and requires a significant amount of additional water to wet its particles—further diminishing its effectiveness as a weighting agent. Therefore, although it is commonly used in drilling fluids and spacer fluids, barite is seldom used in cement slurries.

With a specific gravity of 4.95, hematite is an efficient weighting agent and is routinely used in the industry. It is usually supplied with a fine particle size distribution, with a median particle size of about 30 μm. To the inventors' knowledge, the only commercially available weighting agent with a finer particle size is Micromax™, manufactured by Elkem AS, Oslo, Norway. It is composed of hausmannite with a median particle size of about 2 μm.

Until recently, it has been assumed that barite, ilmenite, hematite and hausmannite are inert with respect to Portland cement hydration and the set cement. However, the inventors recently discovered that, at high temperatures, hematite and hausmannite are not inert. At this temperature, the calcium-silicate-hydrate mineral xonotlite ($6CaO.6SiO_2.H_2O$) is usually the principal binding phase in set Portland cement that has been stabilized with silica. Hematite and hausmannite react with xonotlite to form other minerals, including andradite ($Ca_2Fe_2Si_3O_{12}$) and calcium manganese silicates such as johannsenite ($CaMnSi_2O_6$). Formation of these minerals is accompanied by a reduction of the cement compressive strength and an increase of cement permeability. Such an effect is potentially detrimental to the set cement's ability to provide zonal isolation.

Therefore, in the context of HPHT wells, it would be desirable to have weighting agents that are inert with respect to calcium-silicate-hydrate minerals in set Portland cement, and do not have a deleterious effect on the physical properties of set Portland cement.

SUMMARY

Embodiments allow improvements by providing weighting agents for Portland cement slurries that are inert in a HPHT environment.

In an aspect, embodiments relate to well-cementing compositions comprising water and solids comprising Portland cement, silica and an additive comprising one or more metal sulfates in the list comprising barite, celestine and anglesite, wherein the median particle size of the additive is smaller than about 10 μm.

In a further aspect, embodiments relate to methods for maintaining the compressive strength of a cement composition comprising: providing a cement slurry comprising water, Portland cement and silica; and incorporating into the cement slurry an additive comprising one or more metal sulfates in the list comprising barite, celestine and anglesite, the average particle size of the additive being smaller than about 10 μm; and curing the cement slurry at a temperature higher than or equal to about 200° C.

In yet a further aspect, embodiments relate to methods for cementing a subterranean well comprising providing a cement slurry comprising water, Portland cement and silica; incorporating into the cement slurry an additive comprising one or more metal sulfates in the list comprising barite, celestine and anglesite, the average particle size of the additive being smaller than about 10 μm; placing the slurry into the well; the bottomhole temperature in the well being higher than or equal to about 200° C.

DETAILED DESCRIPTION

Figure 1:
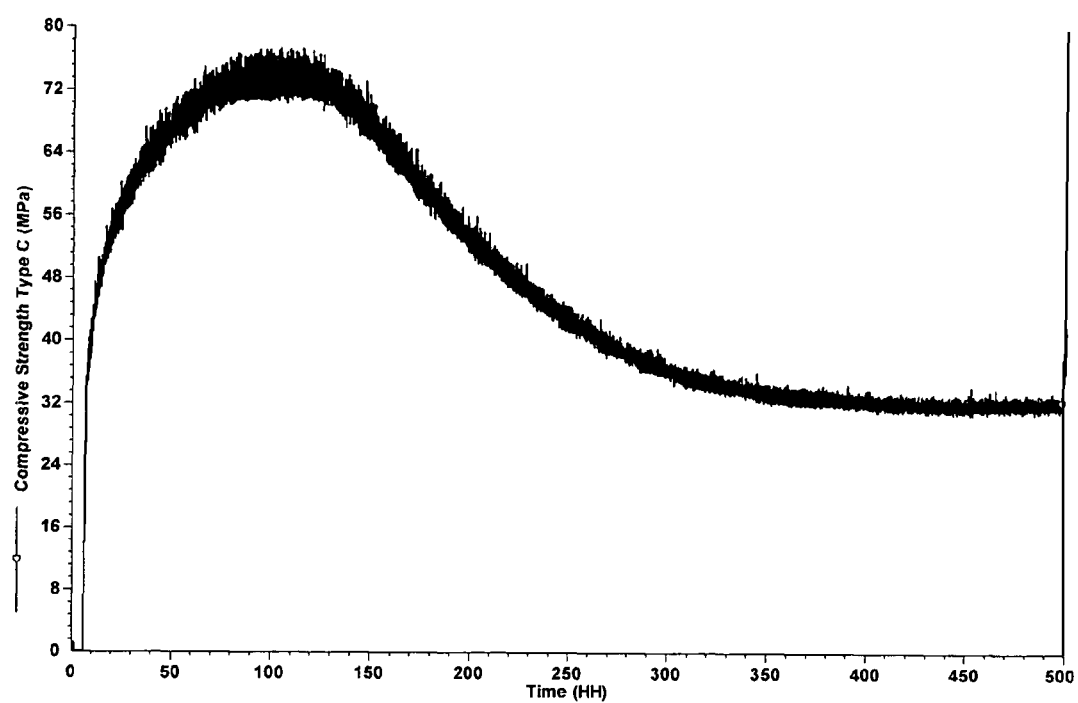
FIG. 1 shows a HPHT strength-development curve for a high-density Portland cement system containing hematite and hausmannite.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range. All ratios or percentages described here after are by weight unless otherwise stated.

As stated earlier, there is a need for weighting agents that are inert with respect to calcium-silicate-hydrate cement minerals under HPHT conditions. The inventors have surprisingly discovered that metal sulfates, including (but not limited to) barium sulfate (barite), strontium sulfate (celestine) and lead sulfate (anglesite), do not react with xonotlite, and do not cause a loss of cement compressive strength or increased cement permeability. Such sulfates are essentially insoluble in water.

In an aspect, embodiments relate to well-cementing compositions that comprise water and solids comprising Portland cement, silica, and an additive comprising one or more members of the list comprising barite, celestine and anglesite. The composition is preferably pumpable. Those skilled in the art will recognize that a pumpable cement slurry usually has a viscosity lower than 1000 mPa-s at a shear rate of 100 s$^{-1}$. Metal sulfates with a very fine particle-size distribution are preferred. The median particle size is preferably smaller than about 10 μm, more preferably smaller than about 5 μm and most preferably equal or smaller than about 3 μm.

In a further aspect, embodiments relate to methods for maintaining the compressive strength of a well-cementing composition. A cement slurry is provided that comprises water, Portland cement and silica. An additive is incorporated into the slurry that comprises one or more members of the list comprising barite, celestine and anglesite. The slurry containing the additive is then cured at a temperature higher than or equal to about 200° C. Metal sulfates with a very fine particle-size distribution are preferred. The median particle size is preferably smaller than about 10 μm, more preferably smaller than about 5 μm and most preferably equal or smaller than about 3 μm.

In yet a further aspect, embodiments relate to methods for cementing subterranean wells. A cement slurry is provided that comprises water, Portland cement and silica. An additive is incorporated into the slurry that comprises one or more members of the list comprising barite, celestine and anglesite. The slurry containing the additive is then placed into the well, wherein the bottomhole temperature is higher than or equal to about 200° C. Metal sulfates with a very fine particle-size distribution are preferred. The median particle size is preferably smaller than about 10 μm, more preferably smaller than about 5 μm and most preferably equal or smaller than about 3 μm. Those skilled in the art will recognize that the methods may pertain to both primary and remedial cementing operations.

For all embodiments, the slurry density is preferably higher than about 2035 kg/m$^3$ (17.0 lbm/gal). The additive concentration is preferably between about 1% and about 150% by weight of cement (BWOC). The slurry may further comprise one or more additives in the list comprising: accelerators, retarders, extenders, fluid-loss additives, dispersants, gas-generating agents, antifoam agents, chemical-expansion agents, flexible additives, pozzolans and fibers. Accelerators may be required in slurries that are pumped in thermal-recovery wells. Such wells are usually shallow and are cemented at a low temperature. During production, the wells may be heated to temperatures exceeding 200° C.

Furthermore, for all embodiments, the solids in the slurry (cement+silica+metal-sulfate additive+additional solid additives) may be present in at least two particle-size ranges. Such designs are "engineered-particle-size" systems in which particle packing is optimized. A thorough description of these systems may be found in the following publication. Nelson E B, Drochon B and Michaux M: "Special Cement Systems," in Nelson E B and Guillot D (eds.) *Well Cementing—2nd Edition*, Houston, Schlumberger (2006) 233-268.

EXAMPLES

The following examples serve to further illustrate the disclosure.

For all examples, cement-slurry preparation and strength measurements were performed according to procedures published in ISO Publication 10426-2. Strength measurements were performed in an Ultrasonic Cement Analyzer (UCA).

Example 1

A solid blend was prepared with the following composition: 35% by volume of blend (BVOB) Dyckerhoff Black Label Class G cement (median particle size ~15 μm), 40% BVOB silica sand (median particle size ~315 μm), 10% BVOB silica flour (median particle size ~3 μm), 5% BVOB hematite (median particle size ~32 μm) and 10% BVOB Micromax™ hausmannite (median particle size ~2 μm). To this mixture, 1.5% by weight of blend (BWOB) bentonite was added.

A fluid was prepared with the following composition: 4.17 L/tonne of blend silicone antifoam agent, 66.8 L/tonne retarder (a blend of sodium pentaborate and pentasodium ethylenediamine tetramethylene phosphonate [EDTMP]—weight ratio: 9.3), 0.75 BWOB styrene sulfonate-maleic anhydride copolymer dispersant (NARLEX™ D72, available from Akzo Nobel), 0.8% BWOB fluid-loss additive (UNIFLAC™, available from Schlumberger), and sufficient water to prepare a slurry with a solid-volume fraction (SVF) of 0.61. The slurry density was 2277 kg/m$^3$ (19.0 lbm/gal).

The slurry was placed in a UCA instrument, and cured at a final temperature of 302° C. (575° F.) and pressure of 122 MPa (17,700 psi). The heat-up time to reach 274° C. (525° F.) was 100 min, and the total heat-up time to reach 302° C. was 240 min. The time to reach 122 MPa was 100 min. The UCA chart is shown in FIG. 1.

The strength reached a maximum value after about 100 hr. Then the strength began to decrease, and reached a plateau after about 400 hr. The UCA test was terminated after 500 hr. At that time the strength had stabilized.

The cement sample was removed from the UCA and cored for measurement of actual compressive strength and water permeability. The compressive-strength result was 20.6 MPa (2990 psi). The water permeability was 0.77 mD, which those skilled in the art would recognize as being too high. For proper zonal isolation, the maximum allowable permeability value is generally considered to be 0.1 mD.

Next, the sample was ground to a fine powder and dried first with acetone and then with ethyl ether. The crystalline composition of the powder was analyzed by x-ray diffraction. The cement matrix was mainly composed of johannsenite. A small amount of xonotlite (the expected cement mineral at this temperature) was detected. The presence of hausmannite ($Mn_3O_4$) was not noted.

Example 2

A solid blend was prepared with the following composition: 35% by volume of blend (BVOB) Dyckerhoff Black Label Class G cement (median particle size 15 μm), 40% BVOB silica sand (median particle size ~315 μm), 10% BVOB silica flour (median particle size ~3 μm), 5% BVOB hematite (median particle size ~32 μm) and 10% BVOB hematite (median particle size ~3 μm). To this mixture, 1.5% by weight of blend (BWOB) bentonite was added. The difference between this blend and the one of Example 1 is the replacement of 10% BVOB Micromax™ with the same volume of very fine hematite.

A fluid was prepared with the following composition: 4.17 L/tonne of blend silicone antifoam agent, 66.8 L/tonne retarder (a blend of sodium pentaborate and pentasodium EDTMP—weight ratio: 9.3), 0.75% BWOB styrene sulfonate-maleic anhydride copolymer dispersant (NARLEX™ D72, available from Akzo Nobel), 0.8% BWOB fluid-loss additive (UNIFLAC™) and sufficient water to prepare a slurry with a solid-volume fraction (SVF) of 0.61. The slurry density was 2280 kg/m$^3$ (19.03 lbm/gal).

Figure 2:
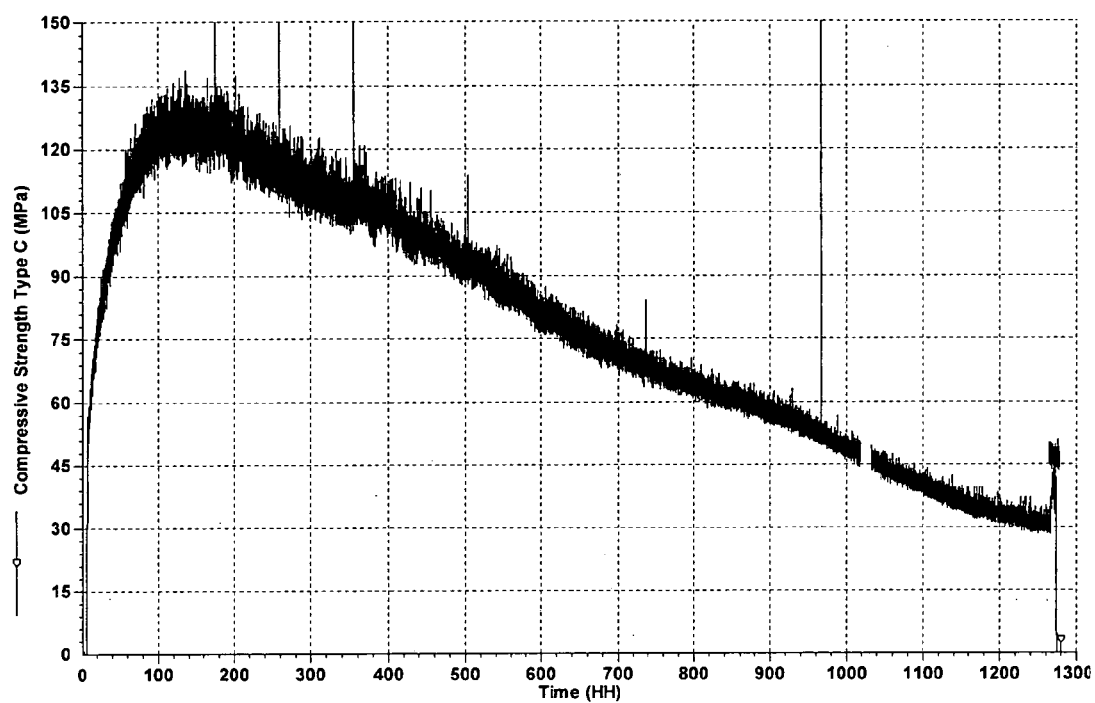
FIG. 2 shows a HPHT strength-development curve for a high-density Portland cement system containing hematite with two particle-size distributions.

The slurry was placed in a UCA instrument, and cured at a final temperature of 302° C. (575° F.) and pressure of 122 MPa (17,700 psi). The heat-up time to reach 274° C. (525° F.) was 100 min, and the total heat-up time to reach 302° C.

was 240 min. The time to reach 122 MPa was 100 min. The UCA chart is shown in FIG. 2.

The strength reached a maximum value after about 150 hr. Then the strength began to decrease, and was still decreasing after 1260 hr when the test was terminated.

The cement sample was removed from the UCA and cored for measurement of actual compressive strength and water permeability. The compressive-strength result was 12.2 MPa (1770 psi). The water permeability was 0.15 mD, which those skilled in the art would recognize as being too high. For proper zonal isolation, the maximum allowable permeability value is generally considered to be 0.1 mD.

Next, the sample was ground to a fine powder and dried first with acetone and then with ethyl ether. The crystalline composition of the powder was analyzed by x-ray diffraction. The cement matrix was mainly composed of andradite and quartz. Small amounts of xonotlite and hematite were detected.

Another UCA test was performed with this cement formulation. In this case, the test was terminated after only 216 hr. The compressive strength of the cement core was 27.4 MPa (3975 psi), and the water permeability was below 0.007 mD (the detection limit of the equipment). The cement matrix was mostly composed of xonotlite, quartz and hematite. This result shows that xonotlite was initially the principal binding phase but, with time, was consumed by reacting with hematite.

Example 3

Next, titanium oxide ($TiO_2$, also known as rutile) was used. Its specific gravity is 4.15.

A solid blend was prepared with the following composition: 35% by volume of blend (BVOB) Dyckerhoff Black Label Class G cement (median particle size ~15 μm), 40% BVOB silica sand (median particle size ~315 μm), 10% BVOB silica flour (median particle size ~3 μm), 5% BVOB hematite (median particle size ~32 μm) and 10% BVOB rutile (Ti-Pure R-902, available from DuPont Titanium Technologies—median particle size ~0.6 μm). To this mixture, 1.5% by weight of blend (BWOB) bentonite was added. The difference between this blend and the one of Example 1 is the replacement of 10% BVOB Micromax™ with the same volume of titanium oxide.

A fluid was prepared with the following composition: 4.17 L/tonne of blend silicone antifoam agent, 66.8 L/tonne retarder (a blend of sodium pentaborate and pentasodium EDTMP—weight ratio: 9.3), 0.75% BWOB styrene sulfonate-maleic anhydride copolymer (NARLEX™ D72, available from Akzo Nobel), 0.8% BWOB fluid-loss additive (UNIFLAC™) and sufficient water to prepare a slurry with a solid-volume (SVF) of 0.61. The slurry density was 2235 kg/m³ (18.65 lbm/gal).

Figure 3:
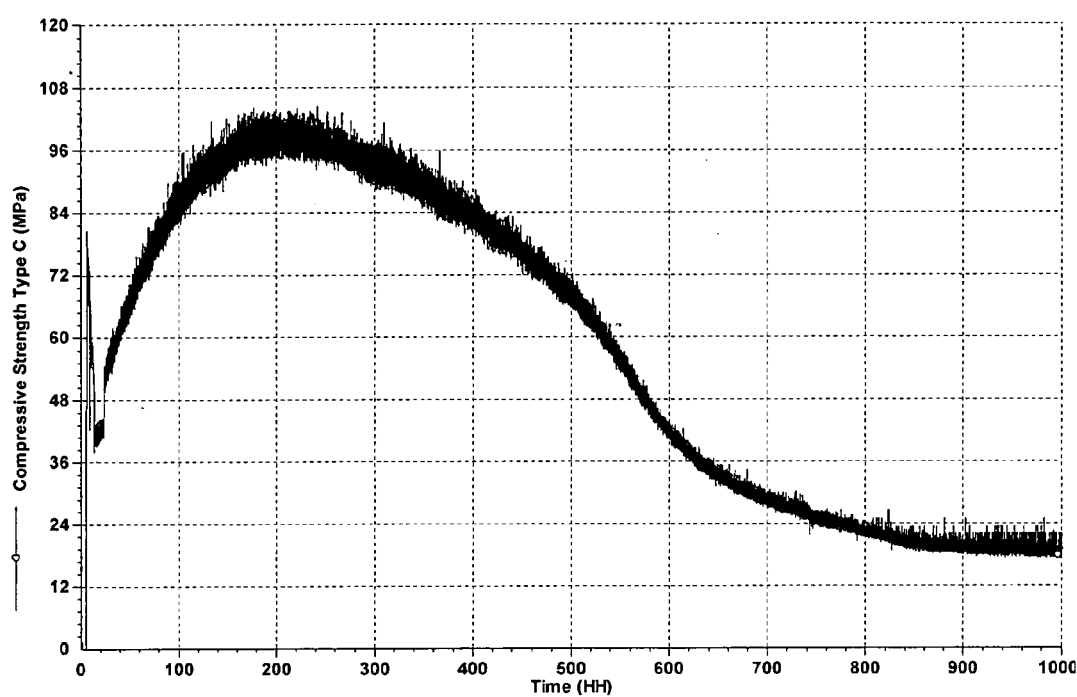
FIG. 3 shows a HPHT strength-development curve for a high-density Portland cement system containing hematite and titanium oxide (rutile).

The slurry was placed in a UCA instrument, and cured at a final temperature of 302° C. (575° F.) and pressure of 122 MPa (17,700 psi). The heat-up time to reach 274° C. (525° F.) was 100 min, and the total heat-up time to reach 302° C. was 240 min. The time to reach 122 MPa was 100 min. The UCA chart is shown in FIG. 3.

The strength reached a maximum value after about 200 hr. Then the strength began to decrease and reached a plateau after about 900 hr. XRD analysis revealed that the cement matrix was mainly composed of titanite ($CaTiSiO_5$) and schorlomite [$Ca_3(Fe,Ti)_2((Si,Ti)O_4)_3$]. Very small amounts of xonotlite and rutile were detected.

Example 4

A solid blend was prepared with the following composition: 35% by volume of blend (BVOB) Dyckerhoff Black Label Class G cement (median particle size ~15 μm), 40% BVOB silica sand (median particle size ~315 μm), 10% BVOB silica flour (median particle size ~3 μm), 5% BVOB barite (median particle size ~17 μm) and 10% BVOB barite (median particle size ~1.5 μm). To this mixture, 1.5% by weight of blend (BWOB) bentonite was added. The difference between this blend and the one of Example 1 is the replacement of 10% BVOB Micromax™ with the same volume of very fine barite, and the replacement of 5% BVOB hematite with the same volume of barite with a larger median particle size.

A fluid was prepared with the following composition: 4.17 L/tonne of blend silicone antifoam agent, 66.8 L/tonne retarder (a blend of sodium pentaborate and pentasodium EDTMP—weight ratio: 9.3), 0.75% BWOB styrene sulfonate-maleic anhydride copolymer (NARLEX™ D72, available from Akzo Nobel), 0.8% BWOB fluid-loss additive (UNIFLAC™) and sufficient water to prepare a slurry with a solid-volume (SVF) of 0.6. The slurry density was 2222 kg/m³ (18.54 lbm/gal).

Figure 4:
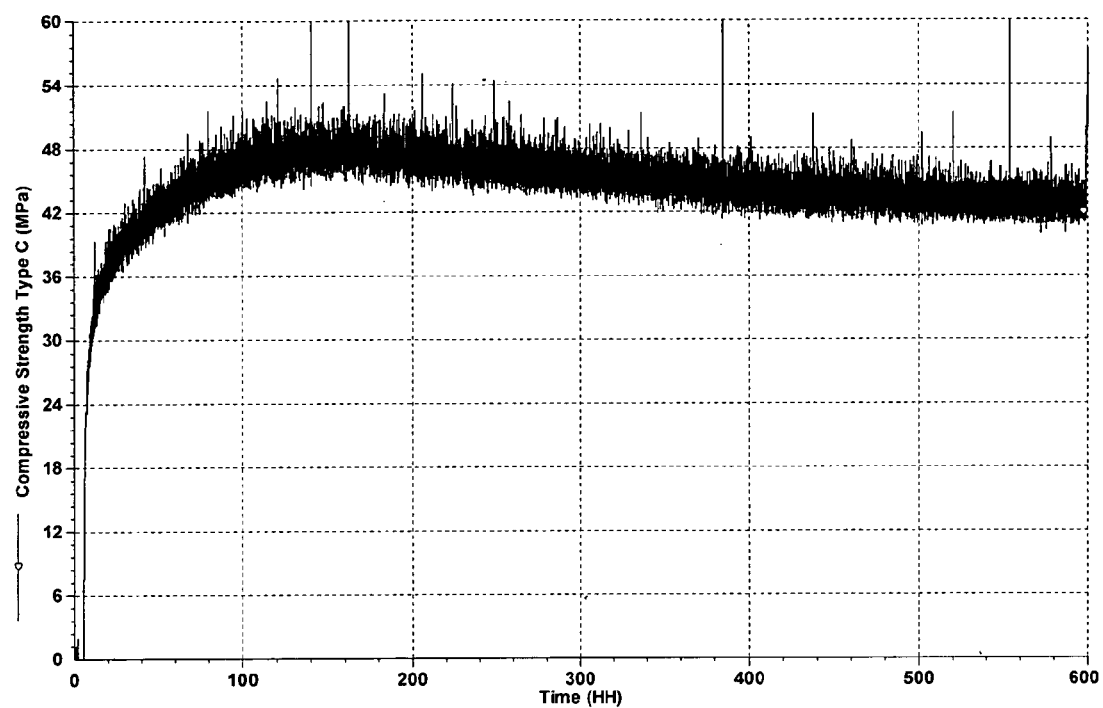
FIG. 4 shows a HPHT strength-development curve for a high-density Portland cement system containing barite with two particle-size distributions.

The slurry was placed in a UCA instrument, and cured at a final temperature of 302° C. (575° F.) and pressure of 122 MPa (17,700 psi). The heat-up time to reach 274° C. (525° F.) was 100 min, and the total heat-up time to reach 302° C. was 240 min. The time to reach 122 MPa was 100 min. The UCA chart is shown in FIG. 4.

The strength reached a maximum value after about 150 hr. Then the strength began to slowly decrease, and reached a plateau after about 500 hr. The UCA test was terminated after 600 hr.

The cement sample was removed from the UCA and cored for measurement of actual compressive strength and water permeability. The compressive-strength result was 26 MPa (3770 psi). The water permeability was 0.008 mD. Unlike the previous tests, these results were acceptable.

Next, the sample was ground to a fine powder and dried first with acetone and then with ethyl ether. The crystalline composition of the powder was analyzed by x-ray diffraction. The cement matrix was mainly composed of xonotlite, quartz and barite, indicating the barite behaves as a chemically inert filler under HPHT conditions.

The invention claimed is:

1. A method for maintaining the compressive strength of a well-cementing composition, comprising:
   (i) providing a cement slurry comprising water, Portland cement, silica and a weighting agent comprising one or more metal sulfates selected from the group consisting of barite, celestine and anglesite, wherein the average particle size of the weighting agent is smaller than 10 μm; and
   (ii) curing the cement slurry at a temperature higher than or equal to 200° C. and a pressure higher than or equal to 69 MPa, such that the cement slurry sets and forms xonotlite as a main binding phase of a set cement,
   wherein the one or more metal sulfates are present in at least two median particle-size ranges such that particle packing is optimized,
   wherein, after 500 hr of curing, xonotlite remains as the main binding phase, and a water permeability of the set cement does not exceed 0.1 mD.

2. The method of claim 1, wherein the density of the composition is higher than 2035 kg/m³.

3. The method of claim 1, wherein the weighting agent concentration is between 1% and 150% by weight of cement.

4. The method of claim 1, wherein the composition further comprises one or more additives selected from the group consisting of accelerators, retarders, extenders, fluid-loss additives, dispersants, gas-generating agents, antifoam agents, chemical-expansion agents, flexible additives, pozzolans and fibers.

5. The method of claim 1, wherein the cement slurry has a viscosity lower than 1000 mPa-s at a shear rate of 100 s$^{-1}$.

6. The method of claim 1, wherein the median particle size of the weighting agent is smaller than 5 µm.

7. A method for cementing a subterranean well, comprising:
   (i) providing a cement slurry comprising water, Portland cement, silica and a weighting agent comprising one or more metal sulfates selected from the group consisting of barite, celestine and anglesite, wherein the average particle size of the weighting agent is smaller than 10 µm; and
   (ii) placing the slurry into the well,
   wherein, a bottomhole temperature in the well is higher than or equal to 200° C. and a pressure is higher than or equal to 69 MPa, such that the cement slurry sets and forms xonotlite as a main binding phase of a set cement,
   wherein the one or more metal sulfates are present in at least two median particle-size ranges such that particle packing is optimized,
   wherein, alter 500 hr of exposure to the bottomhole temperature and bottomhole pressure, xonotlite remains as the main binding phase, and a water permeability of the set cement does not exceed 0.1 mD.

8. The method of claim 7, wherein the density of the composition is higher than 2035 kg/m$^3$.

9. The method of claim 7, wherein the weighting agent concentration is between 1% and 150% by weight of cement.

10. The method of claim 7, wherein the composition further comprises one or more additives selected from the group consisting of accelerators, retarders, extenders, fluid-loss additives, dispersants, gas-generating agents, antifoam agents, chemical-expansion agents, flexible additives, pozzolans and fibers.

11. The method of claim 7, wherein the cement slurry has a viscosity lower than 1000 mPa-s at a shear rate of 100 s$^{-1}$.

* * * * *